United States Patent
Arai et al.

[11] Patent Number: 5,929,936
[45] Date of Patent: Jul. 27, 1999

[54] SYSTEM FOR REDUCING NOISE IN IMAGE DATA THROUGH RECURSIVE OPERATION

[75] Inventors: Naohisa Arai, Kanagawa; Masashi Ohta, Tokyo; Toshimichi Hamada, Kanagawa, all of Japan

[73] Assignee: Sony Corporation, Tokyo, Japan

[21] Appl. No.: 08/853,722

[22] Filed: May 9, 1997

[30] Foreign Application Priority Data

May 14, 1996 [JP] Japan .................................. 8-143557

[51] Int. Cl.⁶ .................................................. H04N 5/213
[52] U.S. Cl. ......................... 348/607; 348/621; 348/622; 348/620; 348/624
[58] Field of Search ................................. 348/607, 618, 348/619, 620, 621, 622, 624, 712, 713; H04N 5/21, 5/213

[56] References Cited

U.S. PATENT DOCUMENTS 5,373,326 12/1994 Nojima ..................................... 348/624
5,448,303 9/1995 Desor ..................................... 348/618

*Primary Examiner*—Sherrie Hsia
*Attorney, Agent, or Firm*—Frommer Lawrence & Haug, LLP.; William S. Frommer

[57] ABSTRACT

A noise reducer to which image data obtained by decoding coding data using a DCT coding is supplied. The noise reduser is comprised as follows. Noise extracting unit for extracting a noise component, first and second noise cancelling unit for cancelling the extracted noise component from input image data, a memory for delaying the image data from the first noise cancelling unit by a predetermined amount and supplying the delayed image data to the noise extracting unit, decimating unit for decimating the image data to be written into the memory, and interpolating unit for interpolating an output of the noise extracting unit and supplying the interpolated output to the second noise cancelling unit whose output is taken out.

18 Claims, 16 Drawing Sheets

SYSTEM FOR REDUCING NOISE IN IMAGE DATA THROUGH RECURSIVE OPERATION

BACKGROUND OF THE INVENTION

1. Field of the Invention

The invention relates to a recursive noise reducer which is suitable when applying to an image signal in which, for example, a coding using a DCT is decoded.

2. Description of the Related Art

A recursive noise reducer using a frame memory is known in the field of digital image signal processes. The noise reducer is constructed in a manner such that a portion of small level in a difference between an input image signal and a video signal one frame before from the frame memory is extracted as a noise and the extracted noise component is subtracted from the input image signal, so that the noise is reduced and the signal in which noises are reduced is written into the frame memory. If a field memory is used in place of the frame memory, a capacity of the memory can be decreased.

The DCT (Discrete Cosine Transform) is used in an image compression coding of an MPEG (Moving Pictures Expert Group) standard or the like. The DCT divides an image into blocks and performs a cosine transformation coding every block. In case of the DCT, a block distortion in which a boundary of the block is seen in the decoded image occurs due to an quantization error of coefficients of an AC component. Since the block distortion differs between the fields, low band noises between fields in which a time dependent transition of the block distortion is seen as a flicker occur.

In the conventional recursive noise reducer, all of the image data of one field or one frame is written in a memory in a feedback loop. In other words, since a noise reducing process is performed to all of the bands in which an image signal exists, a memory capacity cannot be reduced to a value smaller than one field or one frame, so that there is a problem of high costs as a home-use apparatus. A system in which in the case where an image signal obtained by decoding an image signal which was DCT coded is inputted, a block distortion is predicted and the block distortion is corrected upon decoding has also been proposed. However, the block distortion cannot correctly predicted depending on conditions of an image and there is a possibility of an erroneous operation.

OBJECTS AND SUMMARY OF THE INVENTION

It is, therefore, an object of the invention to provide a noise reducer of low costs which can further reduce a capacity of a memory that is used.

As mentioned above, noises which are conspicuous in an image obtained by decoding DCT are low band noises between fields. By paying attention to this point, the present invention intends to provide a recursive noise reducer for reducing low band noises between fields.

To solve the above subject, according to the invention, there is provided a noise reducer to which image data obtained by decoding coding data using a DCT coding is supplied, comprising: noise extracting unit for extracting a noise component, first and second noise cancelling unit for cancelling the extracted noise component from input image data, a memory for delaying the image data from the first noise cancelling unit by a predetermined amount and supplying the delayed image data to the noise extracting unit, decimating unit for decimating the image data to be written into the memory, and interpolating unit for interpolating an output of the noise extracting unit and supplying the interpolated output to the second noise cancelling unit whose output is taken out.

Since low band noises between fields or between frames included in the image data obtained by decoding the DCT coding are conspicuous, those noises are reduced. The decimated data is stored into a field memory or frame memory. Although a signal band is narrowed by the decimation, no problem occurs in the reduction of the low band noises. Since the memory stores the decimated image data, the memory capacity can be decreased.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described hereinbelow with reference to the drawings. The embodiment is obtained by applying the invention to a noise reducer of a video CD player. A video CD is go used to reproduce a digital motion image based on MPEG1. The video CD is based on a data format of a CD-ROM and has a data structure such that MPEG video data and MPEG audio data are arranged in a user data area (2324 bytes) of one sector of the CD-ROM in a predetermined data format. The MPEG video data and the MPEG audio data are interleaved and recorded on the disk. The MPEG video data is a digital video signal which was coded by MPEG1. The MPEG audio data is a digital audio signal of a format using LAYER II of MPEG1. A player of the video CD has a structure in which a decoder of the MPEG video data, a decoder of the MPEG audio data, a D/A converter, and the like are added to the structure of a CD-ROM player.

MPEG1 is constructed of a motion compensation interframe predictive coding and a DCT. The invention can be applied to not only MPEG1 but also processes of image data obtained by decoding image data which was compressed by coding (MPEG, JPEGP, or the like) using DCT. The invention can be also applied to apparatuses such as DVD, digital television, and the like without limiting to the video CD player.

Figure 1:
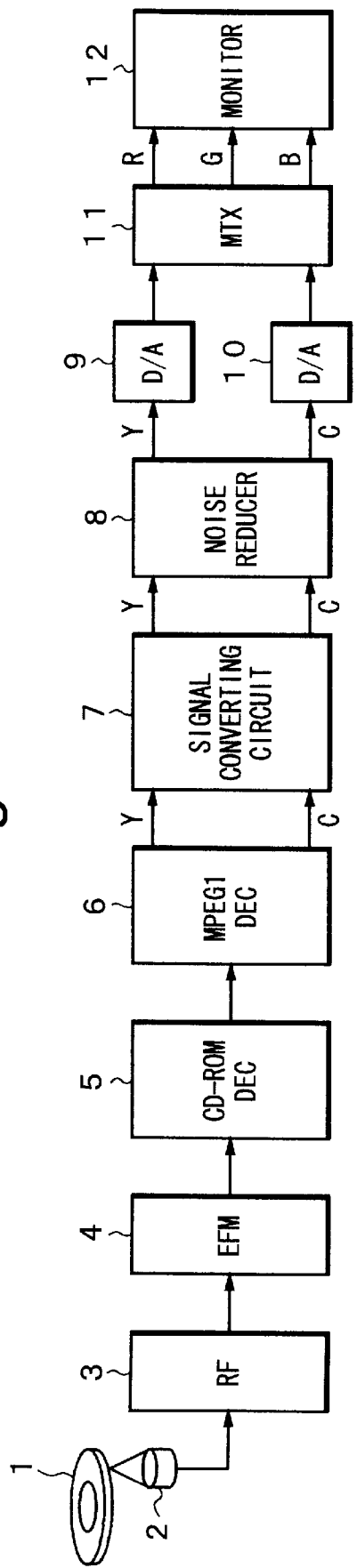
FIG. 1 is a block diagram showing an example of a video CD player to which the invention can be applied.

FIG. 1 shows an example of a video CD player to which the invention can be applied. In FIG. 1, reference numeral 1 denotes a video CD mentioned above. The video CD 1 is read by an optical pickup 2. A reproduction RF signal from the optical pickup 2 is inputted to an RF amplifier 3. The reproduction RF signal amplified here is demodulated by an EFM (8–14 modulation) demodulating circuit 4. A (serial) reproduction signal from the EFM demodulating circuit 4 is supplied to a CD-ROM decoder 5.

The RF amplifier 3, EFM demodulating circuit 4, and CD-ROM decoder 5 has functions similar to those of the existing CD-ROM player. In FIG. 1, processes of audio data are omitted for simplicity of explanation. The CD-ROM decoder 5 converts the serial reproduction signal into an MPEG1 bit stream signal and supplies the bit stream signal to an MPEG1 decoder 6.

The MPEG1 decoder 6 decodes a bit stream in accordance with a format of MPEG1 and supplies a decoding output (luminance signal Y and chrominance signal C) to a signal converting circuit 7. The signal converting circuit 7 outputs a signal of a format of NTSC by interpolating a decoding signal in the horizontal and vertical directions. The luminance signal and chrominance signal from the signal converting circuit 7 are supplied to a noise reducer 8. The signals from the signal converting circuit 7 include noises due to coding/decoding in MPEG1, the noises are removed therefrom by the noise reducer 8 as will be explained hereinlater. Although there are block noises and ringing noises as noises which are generated in the coding and decoding steps of block DCT, the noise reducer 8 to which the invention is applied removes the block noises between fields of a low band.

The luminance signal and chrominance signal from the noise reducer 8 are respectively supplied to D/A converters 9 and 10 and are converted into analog signals. The analog luminance signal and analog chrominance signal from the D/A converters 9 and 10 are supplied to a matrix circuit 11. Three primary color signals R, G, and B are generated from the matrix circuit 11. The three primary signals are outputted to a monitor 12. The reproduction image signal of the video CD 1 is reproduced by the monitor 12.

Figure 2:
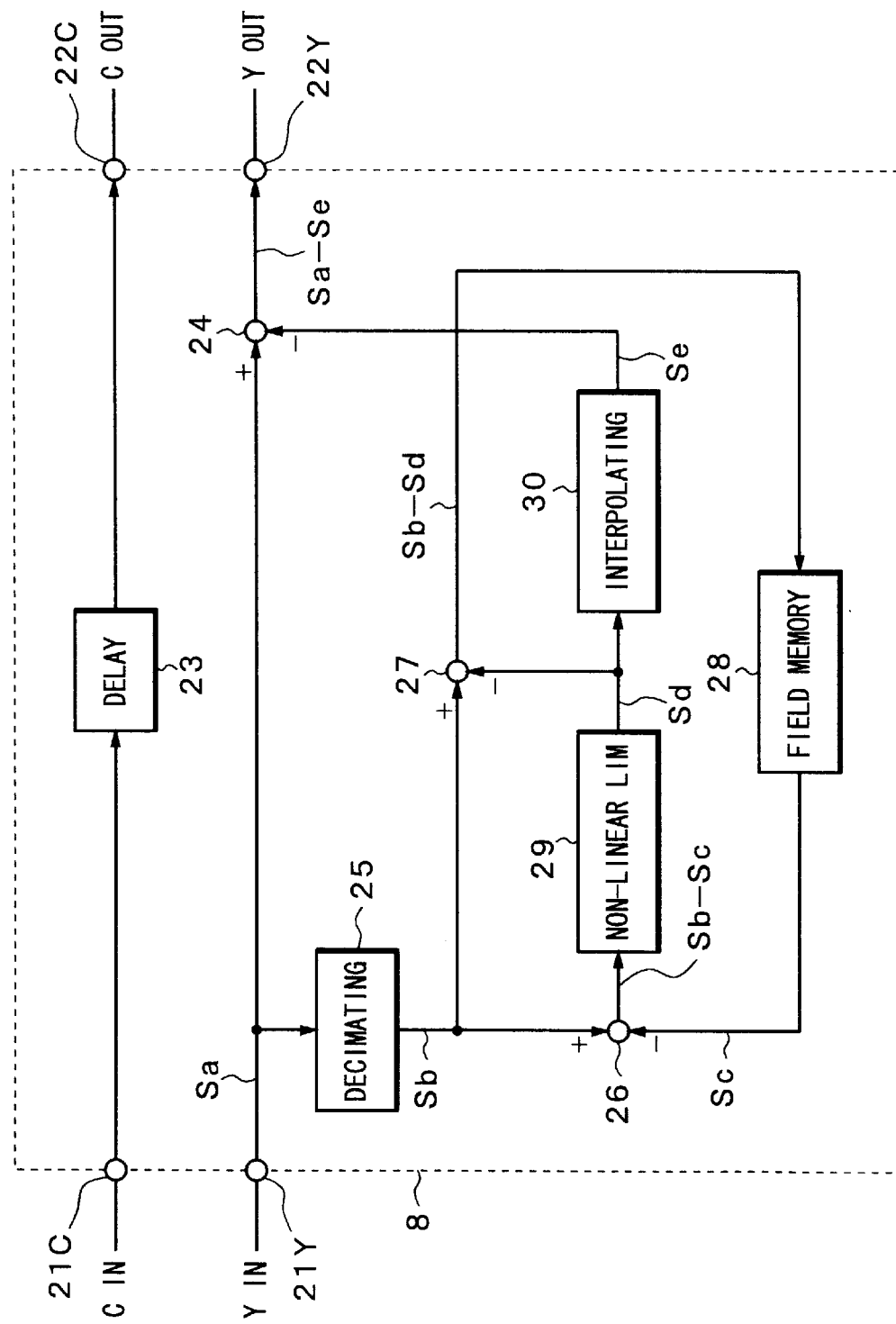
FIG. 2 is a block diagram of the first embodiment of a noise reducer according to the invention.

The invention is applied to the noise reducer 8 in the video CD player as mentioned above. FIG. 2 shows the first embodiment of the noise reducer according to the invention. According to the construction of FIG. 2, noises in a reproduction luminance signal from an input terminal 21Y are reduced. An output luminance signal in which the noises are reduced is taken out to an output terminal 22Y. A reproduction chrominance signal from an input terminal 21C is taken out to an output terminal 22C through a delay circuit 23. The delay circuit 23 is provided in order to compensate a delay of the luminance signal which is caused by the noise reducing process.

A luminance signal Sa inputted from the input terminal 21Y is supplied to a subtractor 24 and a decimating circuit 25 serving as a second noise cancelling unit. The decimating circuit 25 decimates the input luminance signal Sa. As a decimation, a decimation of ¼ or ⅛ can be performed for the purpose of reduction of low band noises. In the first embodiment, the decimating circuit 25 performs a decimation regarding the horizontal direction. For example, the decimation of ¼ in the horizontal direction is executed. A luminance signal Sb in which the number of pixels is reduced by the decimating circuit 25 is supplied to subtracters 26 and 27, respectively. The subtracter 27 constructs a first noise cancelling unit.

The subtracter 26 executes a subtraction to subtract a signal Sc of one field before which was read out from a field memory 28 from the output signal Sb of the decimating circuit 25. An output signal (Sb−Sc) of the subtracter 26 is supplied to a non-linear limiter 29. The signal (Sb−Sc) corresponds to an interfield difference and it is presumed that the low level of this signal relates to a noise component and the high level relates to a motion portion. Therefore, the non-linear limiter 29 allows only the low level of the output signal of the subtracter 26 to pass. A noise extracting unit is made up of the subtracter 26 and non-linear limiter 29.

A noise component Sd extracted by the non-linear limiter 29 is supplied to an interpolating circuit 30 and subtracter 27. The output signal Sb of the decimating circuit 25 is supplied to the subtracter 27 and the subtracter 27 performs an operation of (Sb−Sd). Thus, the luminance signal of a rate of ¼ from which the noises were removed is supplied from the subtracter 27 to the field memory 28. The field memory 28 stores the data of a field that is preceding to the present field with regard to the time and its capacity is reduced to ¼ (in case of the ¼ decimation) or ⅛ (in case of the ⅛ decimation) of the capacity of the field memory to store all pixels of one field of the decoding signal as a result of the decimation.

On the other hand, the interpolating circuit 30 performs a linear interpolation of the noise component Sd extracted by the non-linear limiter 29. Since the rate of the luminance signal in the loop is ¼ of the input signal Sa of the main line system as mentioned above, the noise component which is inputted to the interpolating circuit 30 is also set to a rate of ¼. An interpolation is carried out in the interpolating circuit 30 so as to match with the rate of the main line system. A noise component Se returned to the original rate by the interpolating circuit 30 is inputted to the subtracter 24. On the other hand, the input luminance signal Sa is inputted to the subtracter 24 and noises of the main line system are removed by performing an operation of Sa−Se. The luminance signal from which the noises were removed as mentioned above is taken out to the output terminal 22Y.

Figure 3:
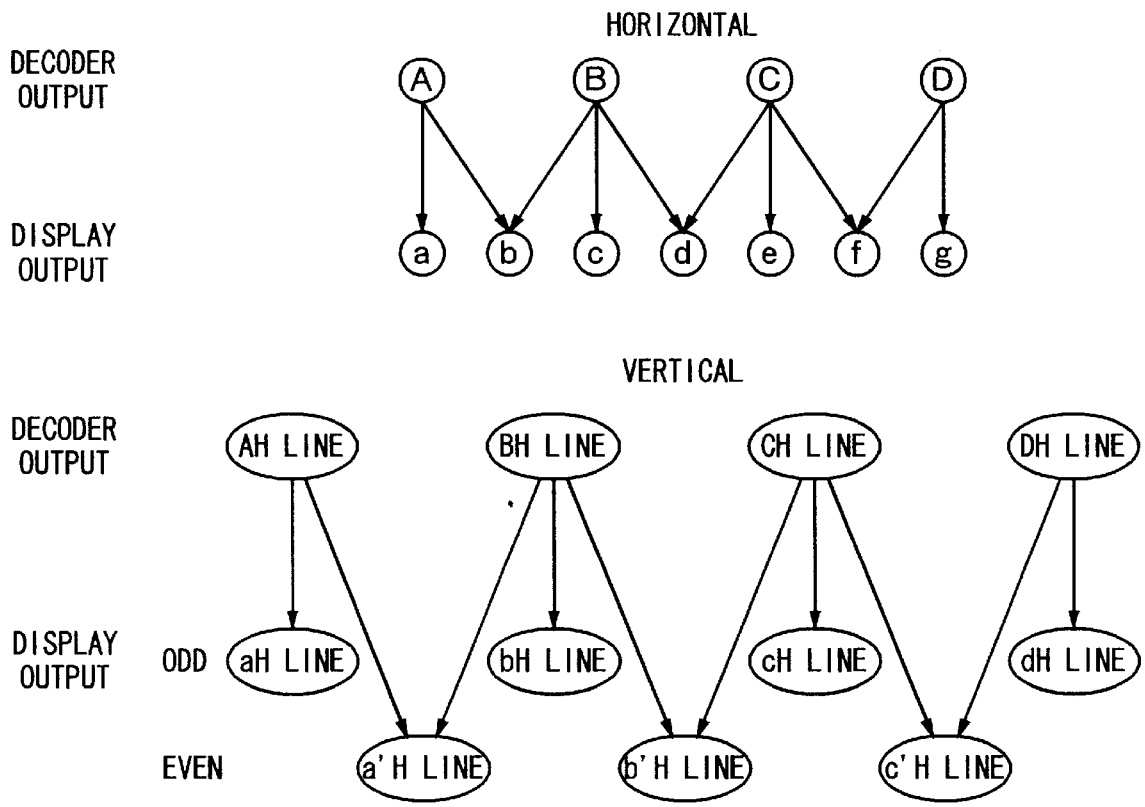
FIG. 3 is a schematic diagram for explaining a process for converting a decoder output of MPEG1 into an NTSC format.

An example of the foregoing noise reducer 8 will be described in more detail. First, the signal which is inputted to the noise reducer 8 is a signal converted into the signal of the NTSC format by the signal converting circuit 7. FIG. 3 shows the operation of the signal converting circuit 7. An output video signal of the decoder 6 of MPEG1 which is inputted to the signal converting circuit 7 is a non-interlace signal in which the number of pixels is equal to 352 (H)×240 (V) (effective portion). The signal (referred to as a display signal) of the NTSC format which is outputted from the signal converting circuit 7 is an interlace signal in which the number of pixels is equal to 704 (H)×240 (V) (effective portion).

Therefore, as shown in FIG. 3, the signal converting circuit 7 respectively interpolates the decoder output in the horizontal and vertical directions and outputs as display signals. In the horizontal direction, when forming pixels of a, b, c, d, e, . . . of the display output, values of pixels A, B, C, . . . at the same positions in the decoder output are used as pixels a, c, e, . . . and mean values (A+B)/2, (B+C)/2, (C+D)/2, . . . of respective two pixels of the decoder output are used as pixels b, d, f, . . . Therefore, the band of the signal doesn't change even if the pixels b, d, f, . . . formed by the interpolation were decimated.

In the vertical direction, lines AH, BH, CH, . . . of the decoder output are used as lines aH, bH, cH, . . . of odd fields of the display signal and mean values (AH+BH)/2, (BH+CH)/2, (CH+DH)/2, . . . of respective two lines are used as lines a'H, b'H, c'H, . . . of even fields.

Figure 4:
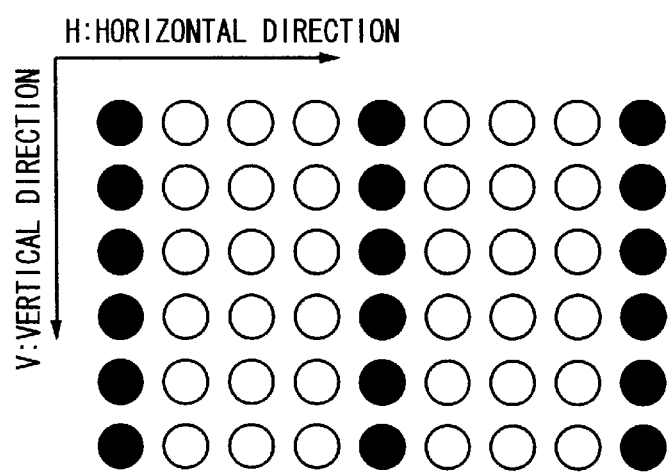
FIG. 4 is a schematic diagram for explaining a ¼ decimation in the horizontal direction.

The decimating operation by the decimating circuit 25 will now be described with reference to FIG. 4. In a pixel arrangement shown in FIG. 4, the decimating circuit 25 selects pixels shown by black dots and decimate pixels of blank circles. Thus, the decimation of ¼ is performed. In this case, the signal band is set to ½ of the decoder output.

Figure 5A:
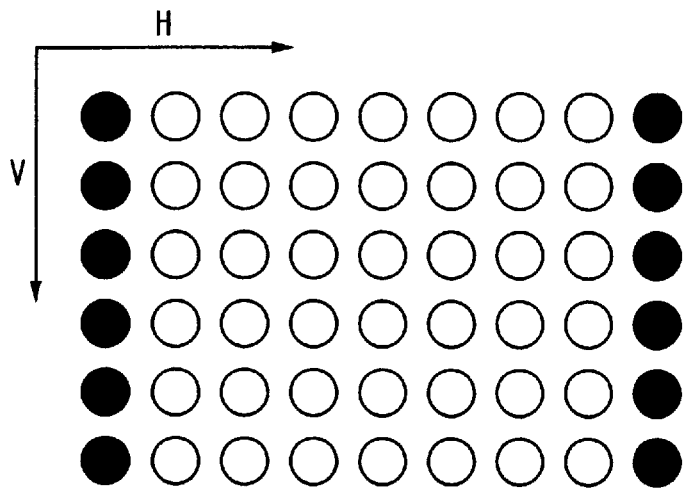
FIGS. 5A, 5B and 5C are schematic diagrams showing several methods of a ⅛ decimation.
Figure 5B:
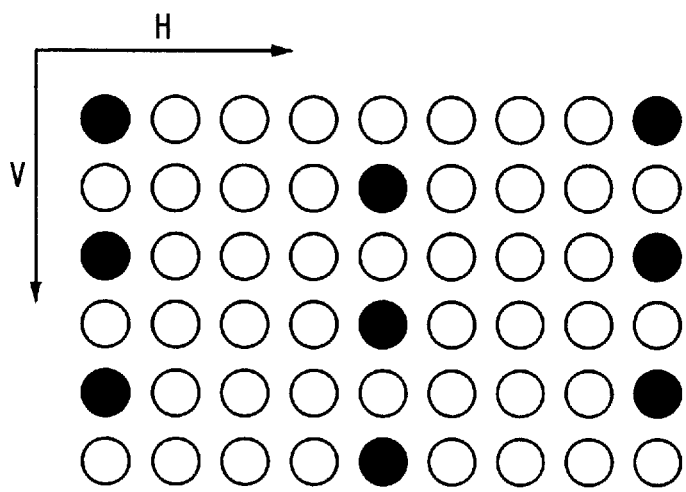
Figure 5C:
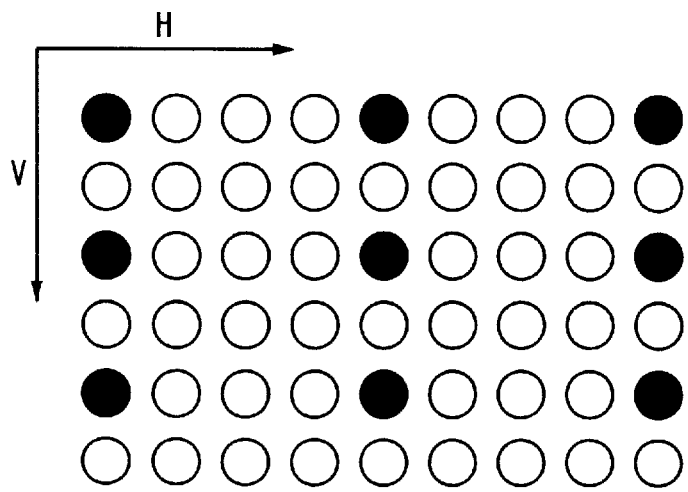

By further performing the ½ decimation for the ¼ decimation, a total ⅛ decimation can be performed. FIGS. 5A, 5B, and 5C respectively show decimating methods in case of the ⅛ decimation. The decimating method of FIG. 5A is a method of performing the ⅛ decimation in only the horizontal direction. According to the method of FIG. 5B, although the ⅛ decimating process is carried out in a manner similar to FIG. 5A, it is a method of deviating sample points by ½ of a sampling interval once per two lines (offset sampling). The method of FIG. 5C is a method of performing the ¼ decimation in the horizontal direction and performing the ½ decimation in the vertical direction, thereby executing the total ⅛ decimation. In case of the ⅛ decimation, the signal band is set to ¼ of the decoder output.

With respect to an influence on a picture quality of the decoding image, when a decimation ratio is low, there is not so large visual difference among the decimating methods. When the decimation ratio is raised from ¼ to ⅛, however, in case of the method whereby sampling patterns are the same among continuous lines, the following trouble (called a vertical stripe noise) occurs in the decoding image as shown in FIG. 5A.

When the decimation process is performed, the interpolating process is carried out in the interpolating circuit 30 in order to return to an ordinary rate. A linear interpolation can be mentioned as a general method for this process. That is, according to the linear interpolation, interpolation data is formed by multiplying a coefficient to the decimation data in accordance with a spatial distance between the decimation data (denotes pixel data existing after the decimation) and the interpolation data (denotes pixel data to be interpolated).

Figure 6:
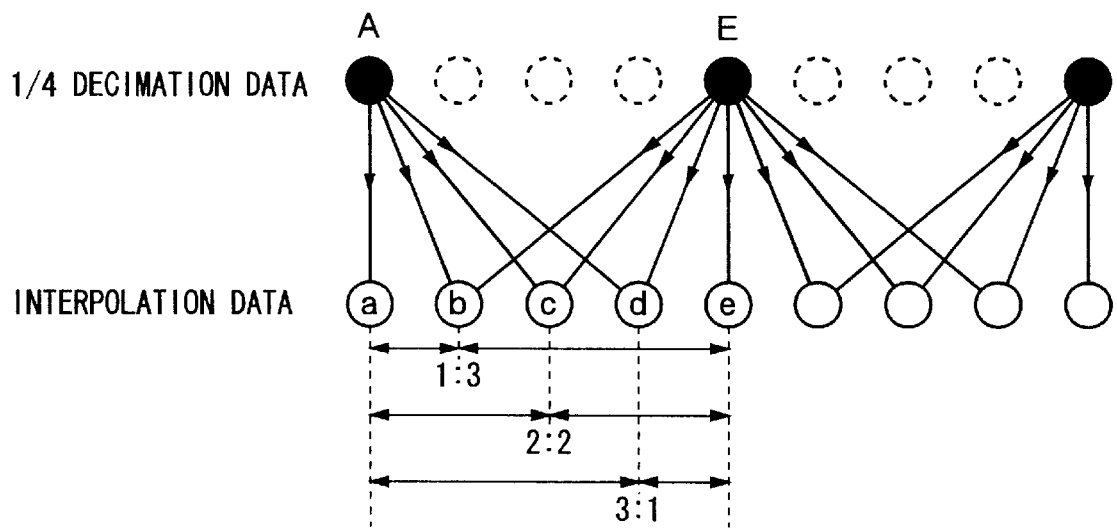
FIG. 6 is a schematic diagram showing an example of an interpolating method of data which was ¼ decimated.

FIG. 6 shows a linear interpolation in case of the ¼ decimation. Now, assuming that a distance from decimation data E is set to K, in interpolation data x between decimation data A and E, a distance from the decimation data A is equal to 1−K. In this instance, a distance between A and E is set to 1. By multiplying a coefficient which is inversely proportional to such a spatial distance, x is obtained. That is, the interpolation data x is obtained by the following equation.

$$x = K \times A + (1-K) \times E$$

For example, interpolation data b in FIG. 6A is calculated by (b=¾×A+¼×B) because K=¾.

Figure 7:
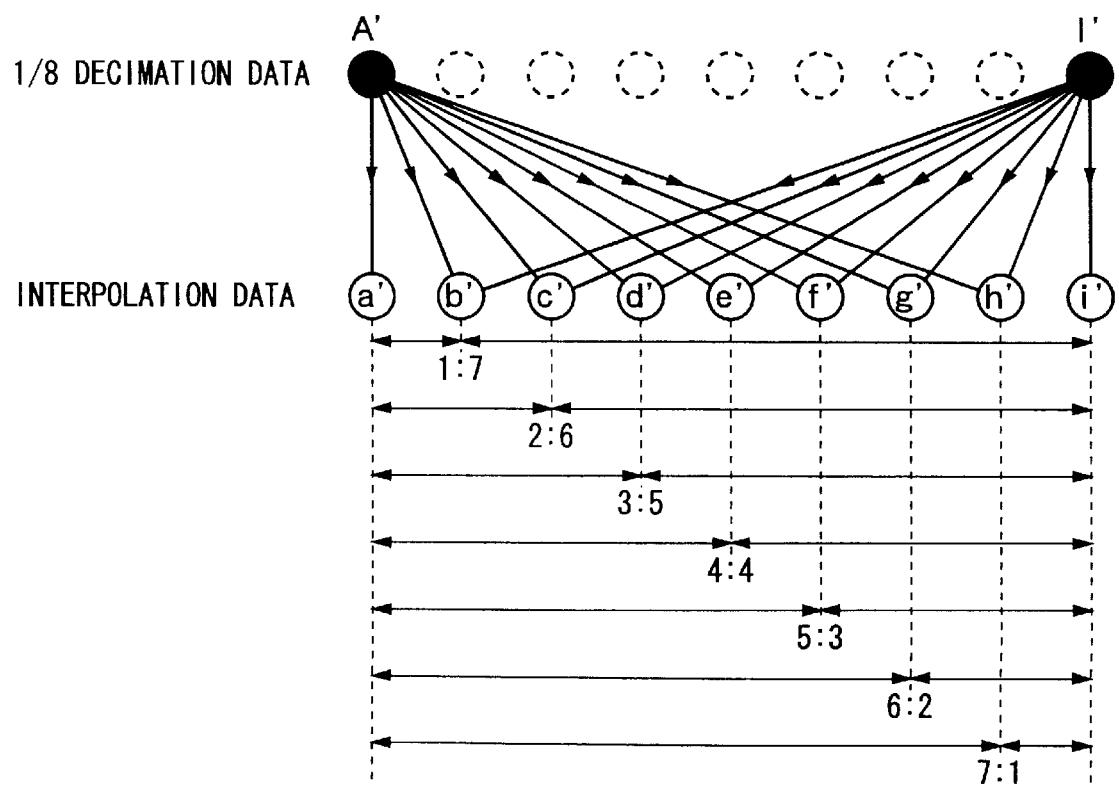
FIG. 7 is a schematic diagram showing an example of an interpolating method of data which was ⅛ decimated.

FIG. 7 shows a linear interpolation in case of the ⅛ decimation. Eight interpolation data a', b', . . . , and i' are formed between decimation data A' and I'. Interpolation data is calculated on the basis of the spatial distance K between the interpolation data and decimation data I' in a manner similar to the interpolating process of the ¼ decimation of FIG. 6A.

Figure 8:
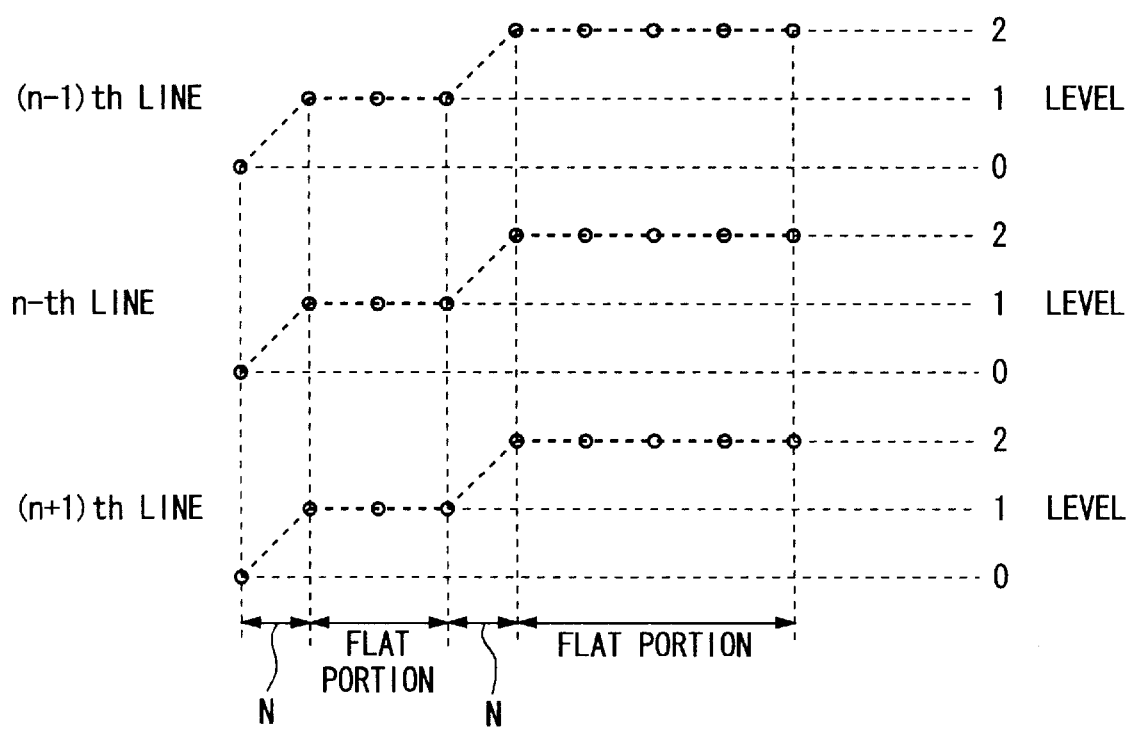
FIG. 8 is a schematic diagram showing an example of a signal waveform after decimation.

In the above linear interpolation, it is insufficient to set the decimated stairway-like signal to a signal of a smooth change. As a decimation ratio is high, a flat portion of the data remains. As shown in FIG. 8, according to the sampling method of FIG. 4 or 5A, since sampling points in the horizontal direction always exist at the same position, as shown by N, breaks among the flat portions are arranged in the vertical direction and are seen as vertical stripe noises.

Figure 9:
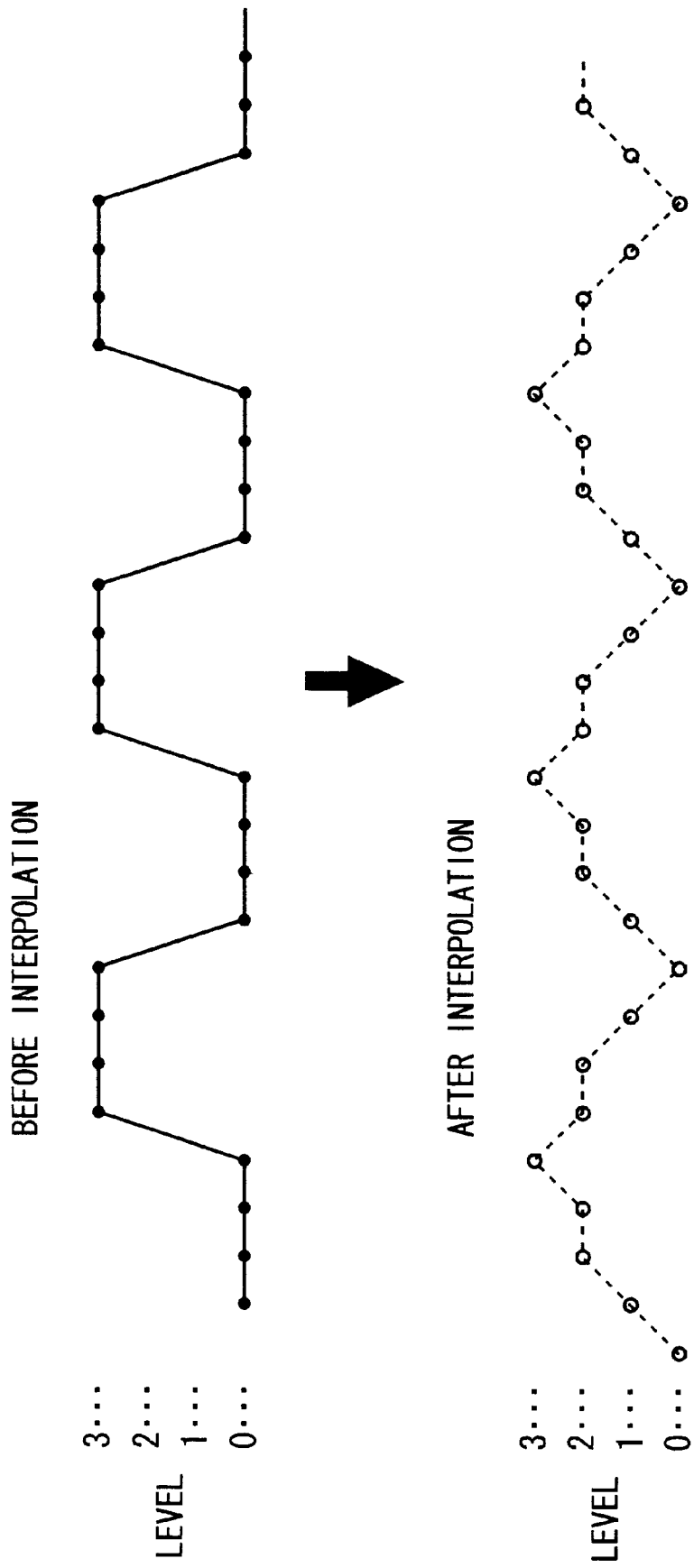
FIG. 9 is a schematic diagram showing a signal waveform after interpolating the ¼ decimation.
Figure 10:
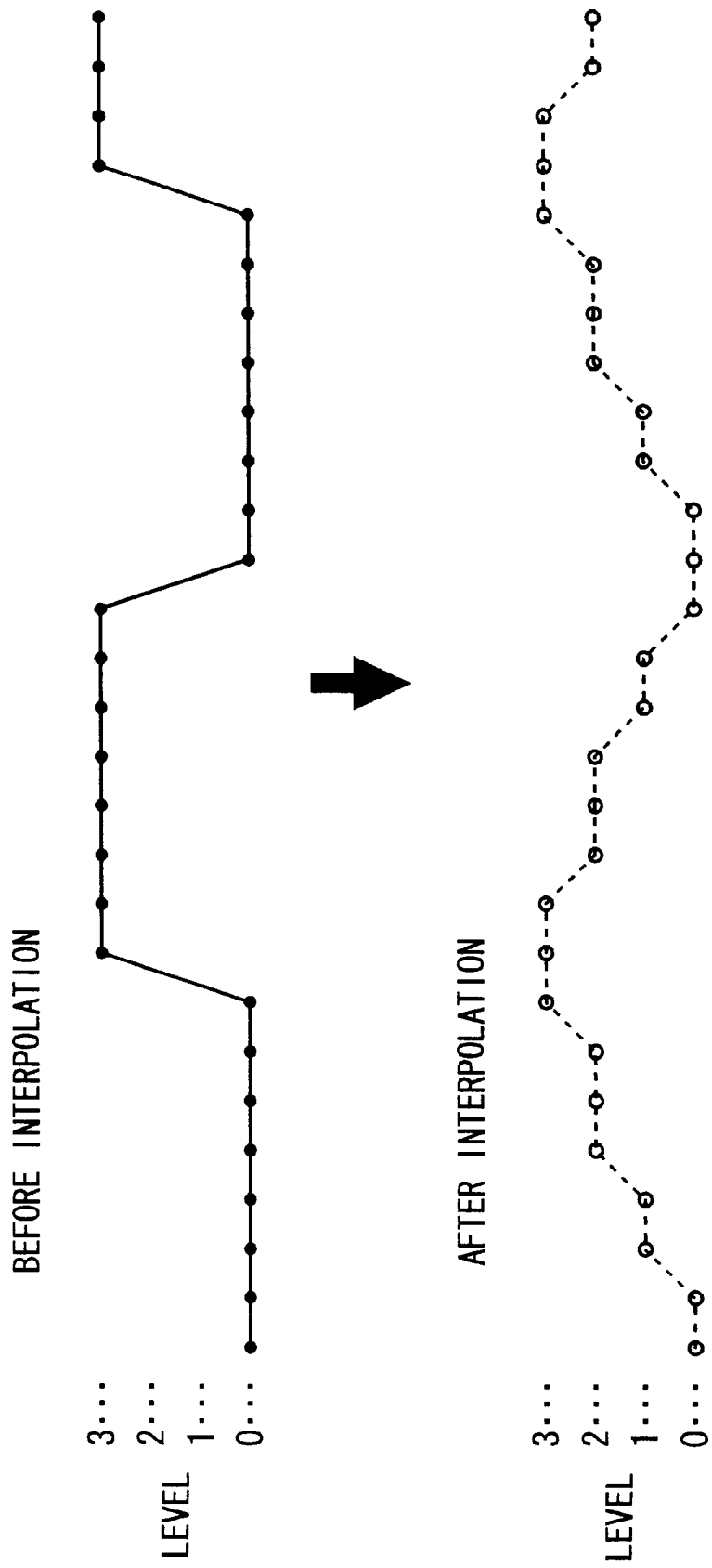
FIG. 10 is a schematic diagram showing a signal waveform after interpolating the ⅛ decimation.

A noise level of an output of the non-linear limiter 29 is equal to about 0 to ±3 (in case of quantizing the luminance signal by eight bits). FIGS. 9 and 10 show representative changes of the noise level (level change 3). FIG. 9 shows the case of the ¼ decimation. FIG. 10 shows the case of the ⅛ decimation. As compared with the case of FIG. 9, in case of FIG. 10, a remaining flat portion after the interpolation is large and vertical stripe noises are conspicuous.

The foregoing vertical stripe noises can be made inconspicuous by selecting a proper decimating method. That is, in the method shown in FIG. 5B mentioned above, since the sample points are deviated between the upper and lower lines (H), the vertical stripe noises are generated every other 1H, so that it is hard to see them. According to the method shown in FIG. 5C, since the decimation in the horizontal direction is the same as the ¼ decimation, the vertical stripe noises are inconspicuous. By those improving methods, the ⅛ decimation can be performed while suppressing a deterioration of a picture quality. Thus, the memory capacity can be reduced into ⅛ as compared with the ¼ decimation and a cheaper system can be constructed.

Figure 11:
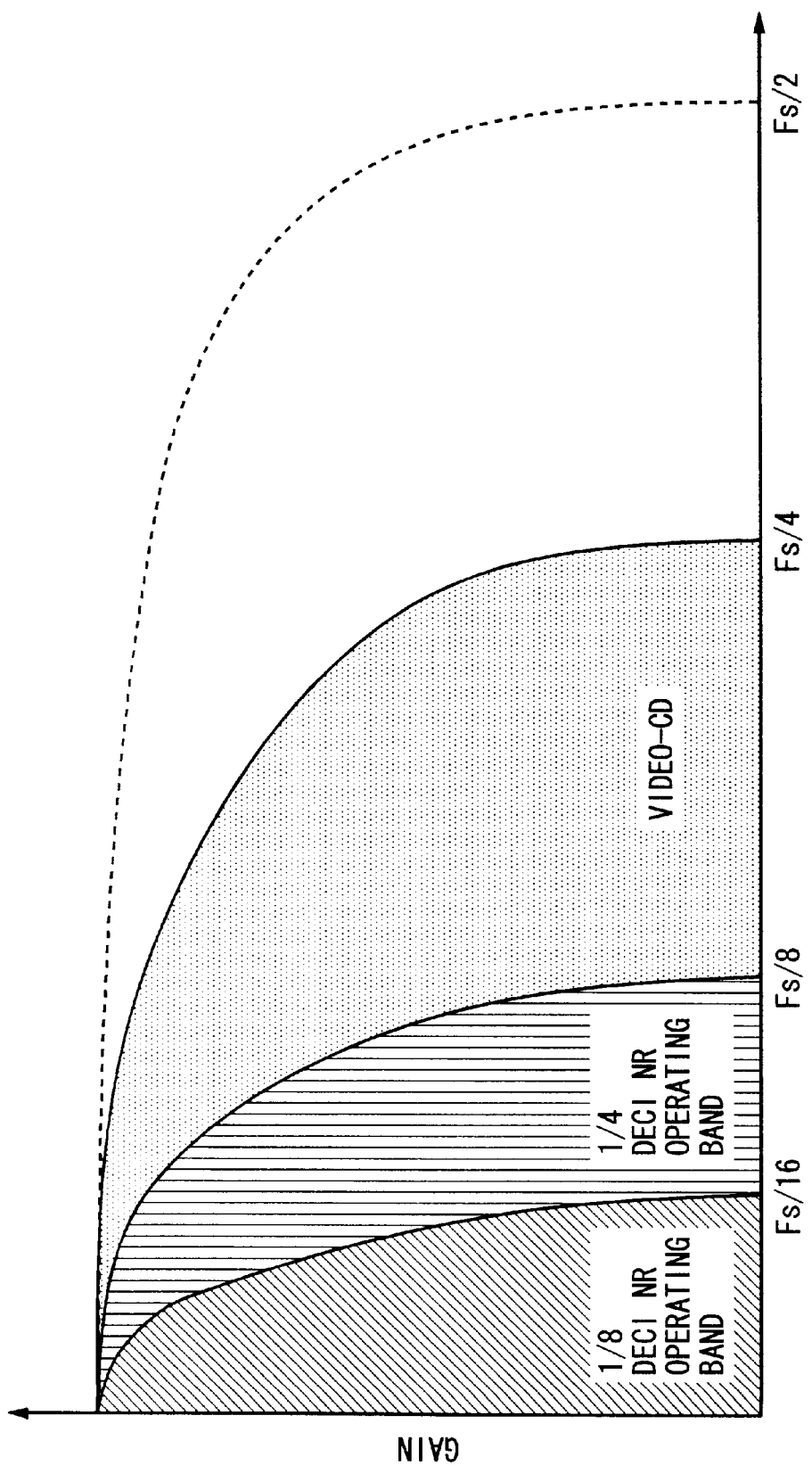
FIG. 11 is a schematic diagram showing an operating band of a noise reducer according to the invention.

FIG. 11 shows a noise removal band of each decimation ratio, in other words, a band where the noise reducer operates. In the reproduction signal of the video CD, now, assuming that a sampling frequency of the digital video signal is set to Fs, a highest frequency is equal to Fs/4. In case of the ¼ decimation, Fs/8 is the highest frequency of the video signal. Therefore, the noise reducer acts on a frequency band lower than Fs/8. Further, in case of the ⅛ decimation, the noise reducer acts on a frequency band lower than Fs/16. As mentioned above, as a decimation ratio rises, only the noises of a low band can be removed. Since it is an object of the invention to remove block noises between fields of a low band among the noises which are generated in the coding and decoding steps of the block DCT, even if the frequency band is narrowed by the decimation, a desired effect can be obtained.

Figure 12:
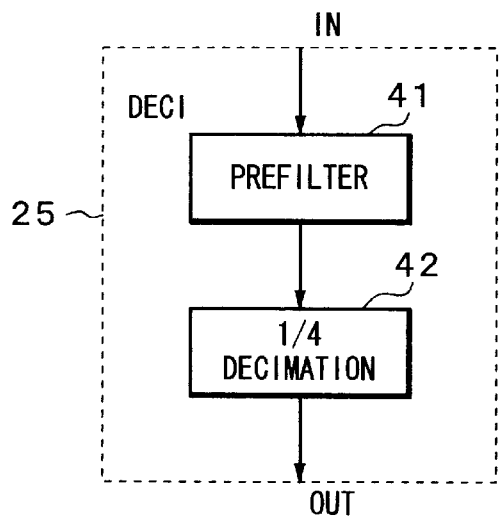
FIG. 12 is a block diagram showing an example of a decimating circuit which can be used in the invention.

A more specific circuit construction of the component elements of the noise reducer 8 will now be described. FIG. 12 shows an example of the decimating circuit 25 in FIG. 2.

Prior to performing the decimating process, it is necessary to limit the frequency band of the signal by a prefilter. Therefore, the decimating circuit 25 is constructed by a prefilter 41 and a ¼ decimating circuit 42.

Figure 13:
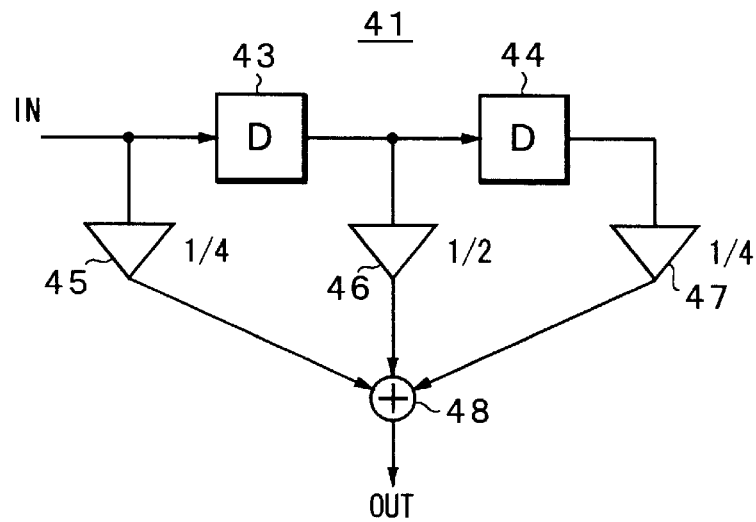
FIG. 13 is a block diagram showing an example of a prefilter which can be used in the decimating circuit.

FIG. 13 shows an example of the prefilter 14. Reference numerals 43 and 44 denote 1-sample delay elements. The delay elements 43 and 44 are serially connected. Multipliers 45, 46, and 47 to multiply filter coefficients to three taps taken out from a serial connection of those delay elements. Multiplication outputs are added by an adder 48. The prefilter 41 shown in FIG. 13 is an FIR filter of three taps. A word length of a signal of a filter output extends in the lower direction down to the second decimal place at most by the coefficient multipliers 45, 46, and 47.

Figure 14:
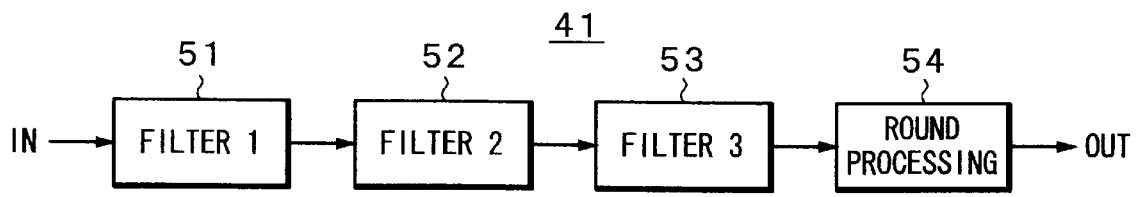
FIG. 14 is a block diagram showing another example of a prefilter which can be used in the decimating circuit.

A construction in which filters 51, 52, and 53 of multiple stages are connected as shown in FIG. 13 can be used as a prefilter 41 as shown in FIG. 14. In this case, the word length further extends. However, since there is a limitation of the word length of data to be written into the field memory 28, a rounding process is necessary. In this case, as shown in FIG. 14, in order to keep a sufficient precision of data, it is preferable to connect a round processing circuit 54 to a position after the filter 53 at the last stage.

Figure 15:
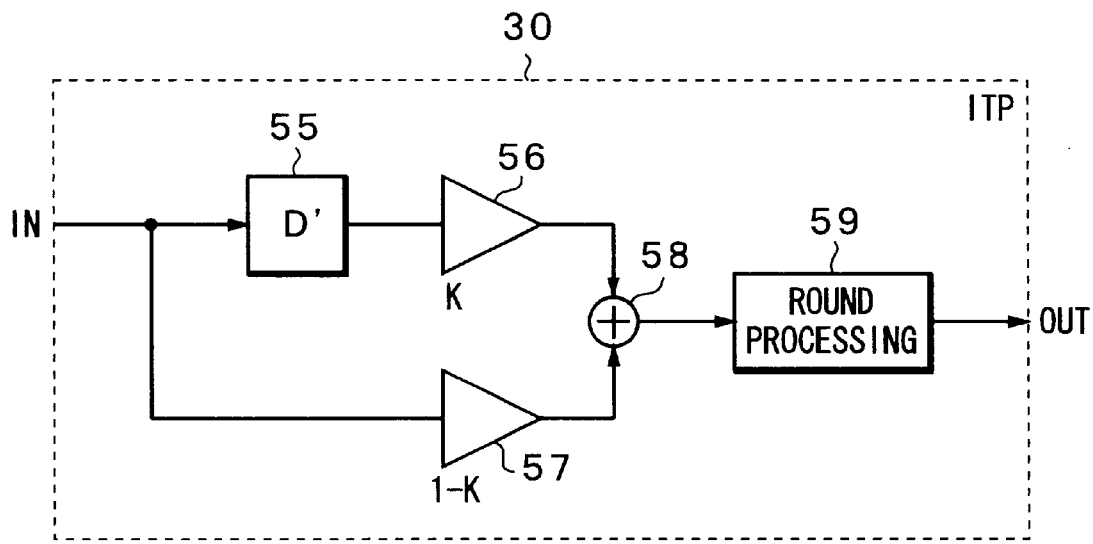
FIG. 15 is a block diagram showing an example of an interpolating circuit which can be used in the invention.

FIG. 15 shows an example of the interpolating circuit 30. The input signal is supplied to an adder 58 through a 1-sample delay element 55 after the decimation and a coefficient (K) multiplier 56 and is also supplied to the adder 58 through a coefficient (1−K) multiplier 57. In case of the ¼ decimation, now assuming that one sample period of a decoder output is set to D, a delay amount D' of the delay element 55 is equal to (D'=4D). K denotes an interpolation coefficient shown in FIG. 6 or 7 and is set to a value according to the spatial distance. In case of the ¼ decimation, since a coefficient of about ¼ is multiplied by the multipliers 56 and 57, in an output of the interpolating circuit 30, the word length extends in a lower direction down to the second decimal place at most.

Since the output signal of the interpolating circuit 30 consists of, for example, eight bits, a rounding process is performed by a round processing circuit 59. In order to keep a sufficient precision of data, the rounding process is executed not during the coefficient calculation (for example, outputs of the multipliers 56 and 57) but just before the output of the interpolating circuit 30.

Figure 16:
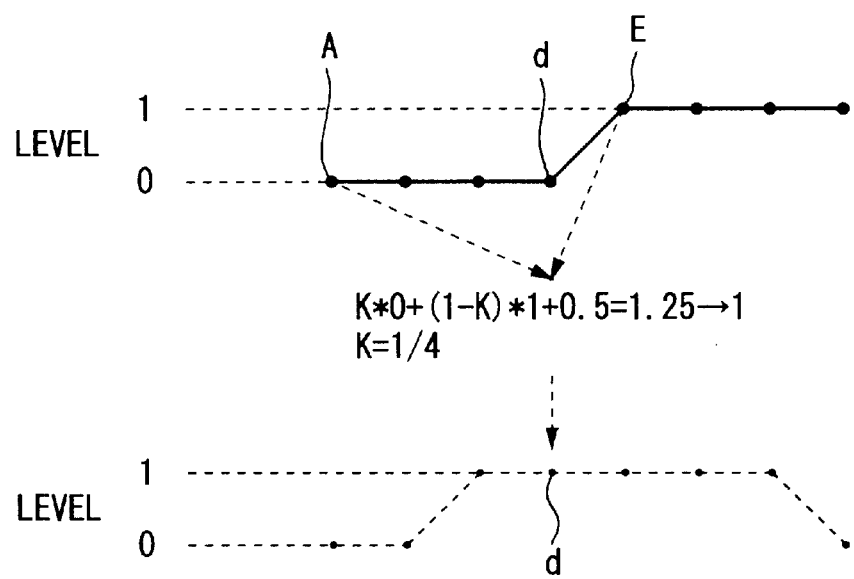
FIG. 16 is a schematic diagram for explaining a rounding process of the interpolating circuit.

FIG. 16 shows an example of the rounding process according to the round processing circuit 59. The example of FIG. 16 shows a case of forming the interpolation data d between the decimation data A (level 0) and E (level 1). In this case, (K=¼). Therefore, the data is interpolated in a manner such that d=¼·0 +¾·1=0.75. In order to round the figures below decimal point of the data, 0.5 is added to the data to be rounded and the figures below decimal point are cut out. Therefore, a rounding process of (0.75+0.5=1.25→1) is executed. The round processing circuit 54 in FIG. 14 also executes a process similar to the foregoing process. By performing such a rounding process, a noise detection and a noise reducing process can be performed at a high precision.

Figure 17:
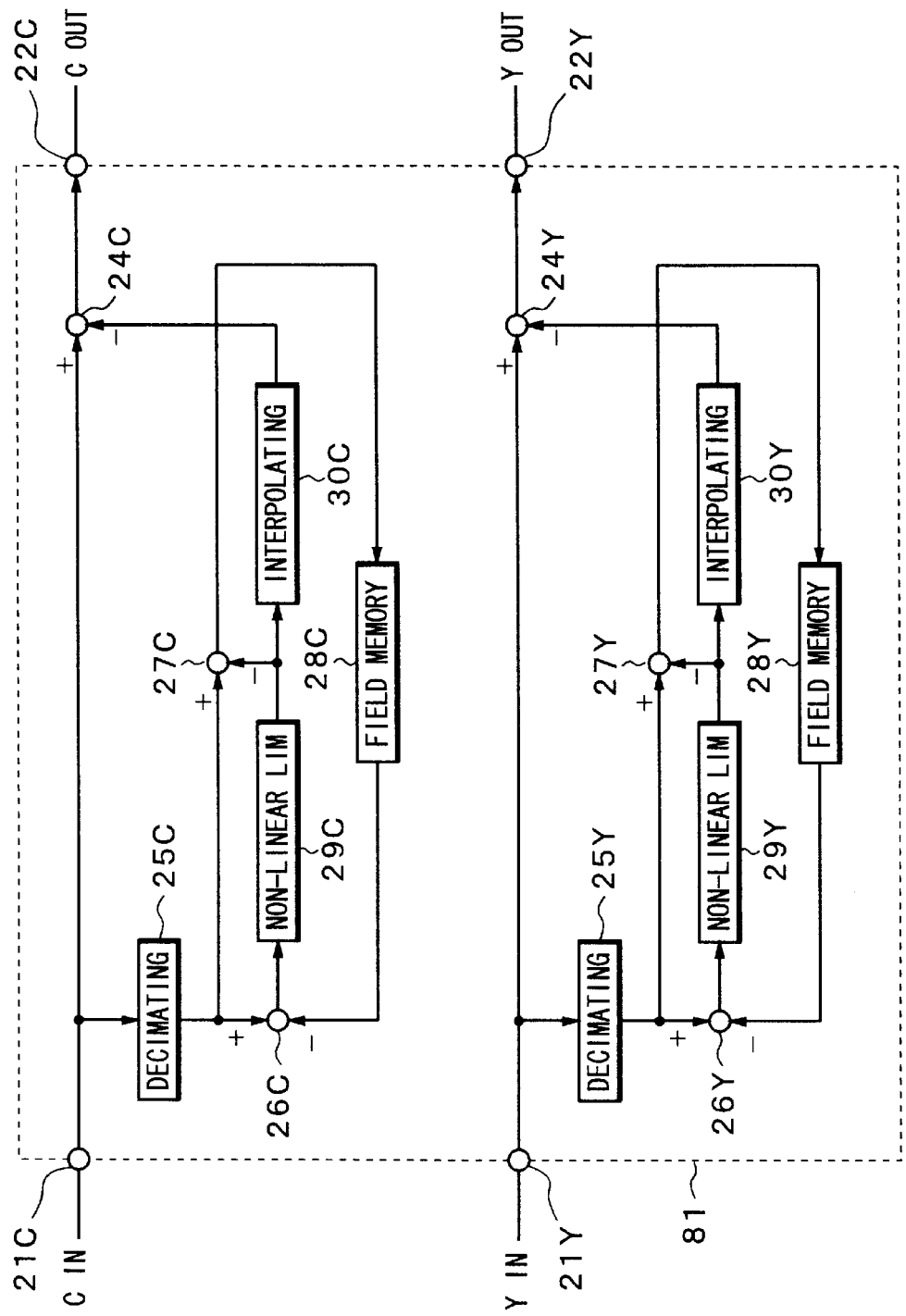
FIG. 17 is a block diagram showing the second embodiment of a noise reducer according to the invention.

Several modifications of the invention will now be described. In FIG. 17, reference numeral 81 denotes the second embodiment of a noise reducer. Although the noise reduction is performed to only the luminance signal of the decoding signal in the foregoing embodiment, a noise reducer 81 also executes a noise reduction to the chrominance signal. The noise reducer for the luminance signal which is supplied to the input terminal 21Y is the same as that for the luminance signal with the construction shown in FIG. 2. A corresponding element is shown by adding a symbol of Y. The noise reducer for the chrominance signal which is supplied from the input terminal 21C also has substantially the same construction regarding the luminance signal. A corresponding component element is shown by adding a symbol C to it. The second embodiment for performing the noise reduction to both of the luminance signal and the chrominance signal further enables a picture quality to be improved.

Figure 18:
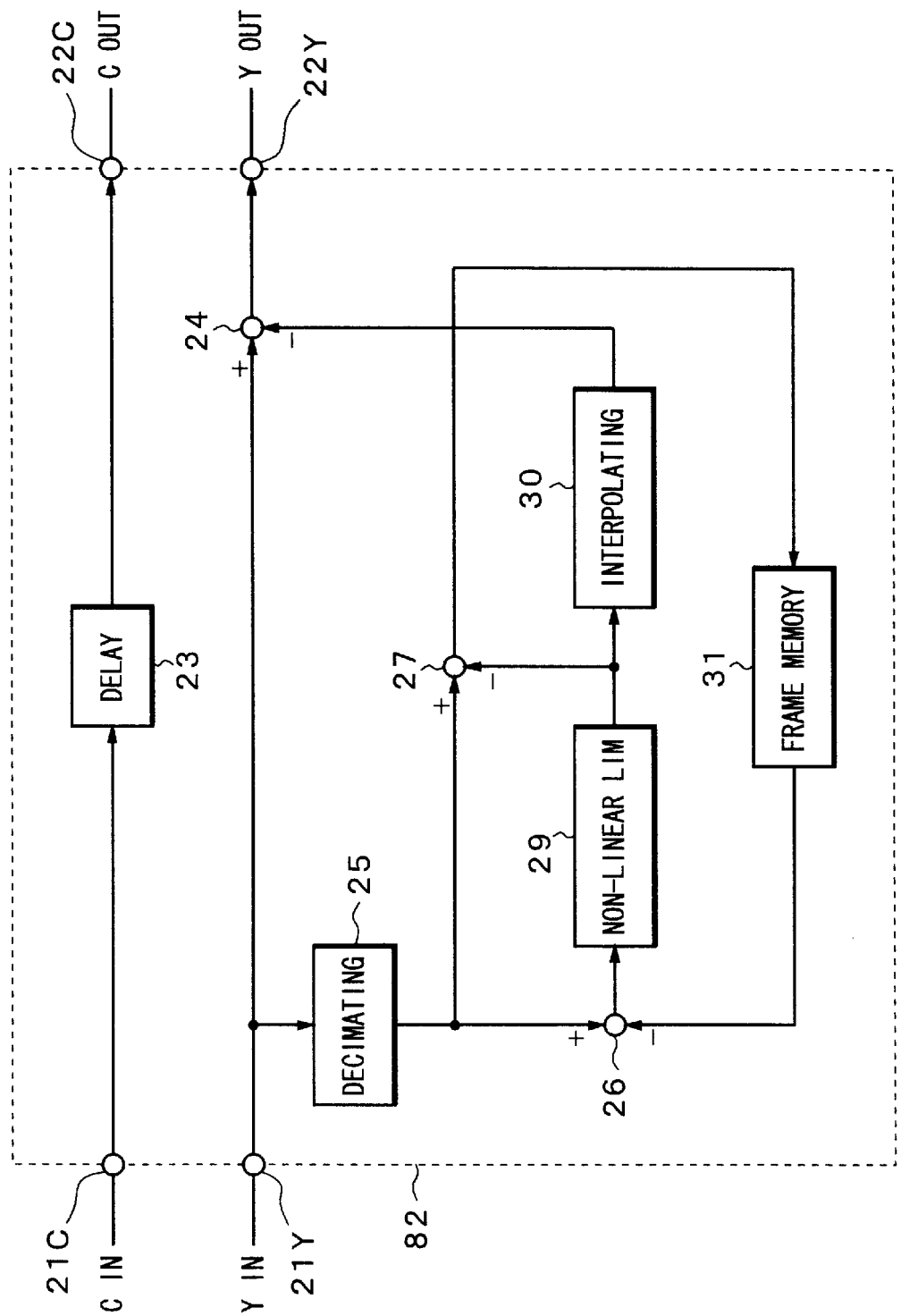
FIG. 18 is a block diagram showing the third embodiment of a noise reducer according to the invention.

In FIG. 18, reference numeral 82 denotes the third embodiment of a noise reducer. In the third embodiment, the noise reduction is performed to only the luminance signal in a manner similar to the first embodiment shown in FIG. 2. In the third embodiment, a frame memory 31 is used in place of the field memory 28. In the case where an image format is set such that the spatial positions of the pixels are different with respect to the odd field and the even field like a high resolution system of 720×480 pixels (frame frequency 30 Hz), the noise can be more effectively reduced by using the frame memory 31.

Figure 19:
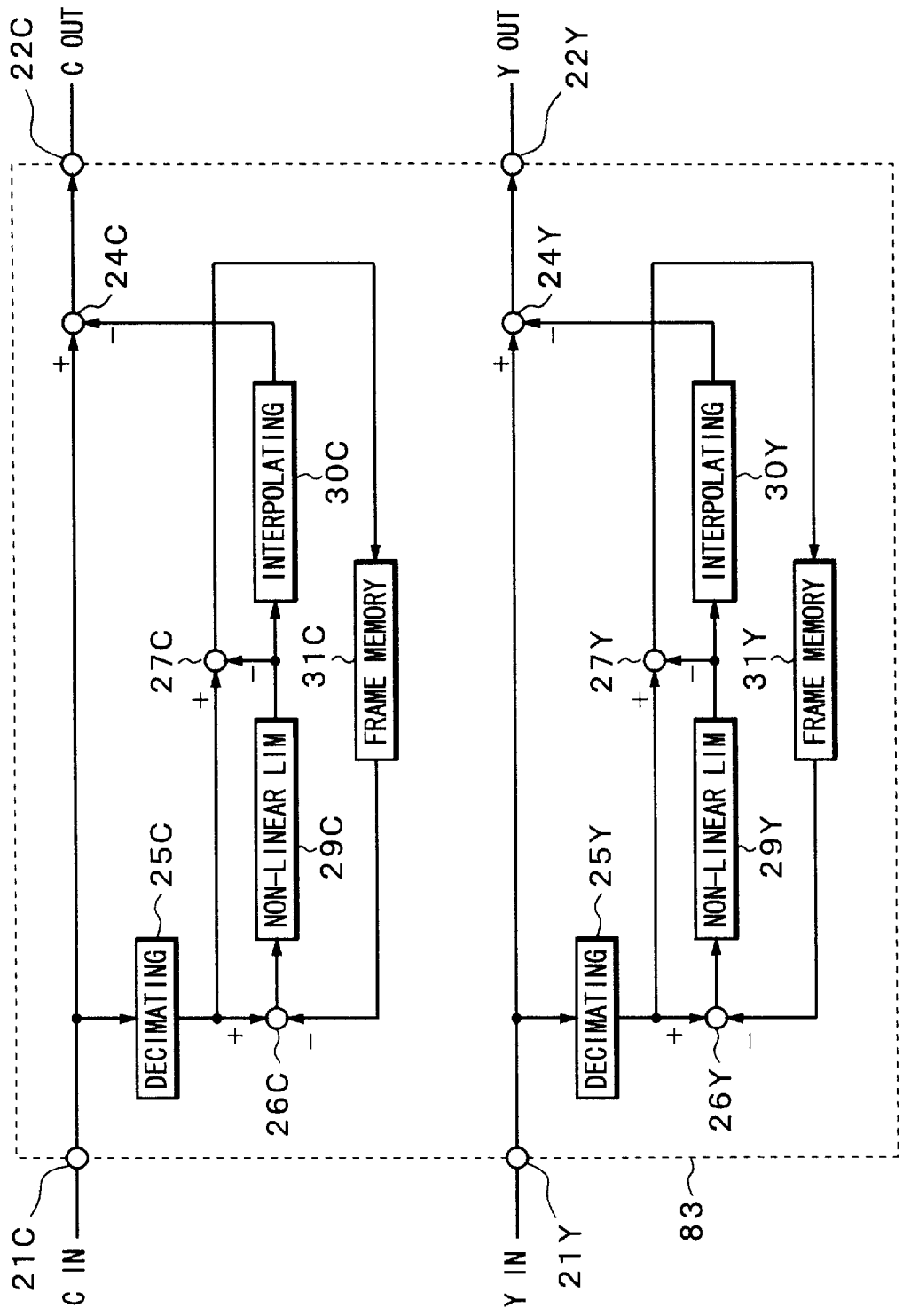
FIG. 19 is a block diagram showing the fourth embodiment of a noise reducer according to the invention.

In FIG. 19, reference numeral 83 denotes the fourth embodiment of a noise reducer. In the fourth embodiment, the noise reduction is performed to both of the luminance signal and the chrominance signal. In the fourth embodiment, a frame memory 31Y is used for a noise reducer for the luminance signal and a frame memory 31C is used for a noise reducer for the chrominance signal. In a manner similar to the third embodiment, the fourth embodiment is suitable for a high resolution system and by performing the noise reduction to both of the luminance signal and the chrominance signal, the picture quality can be further improved.

Figure 20:
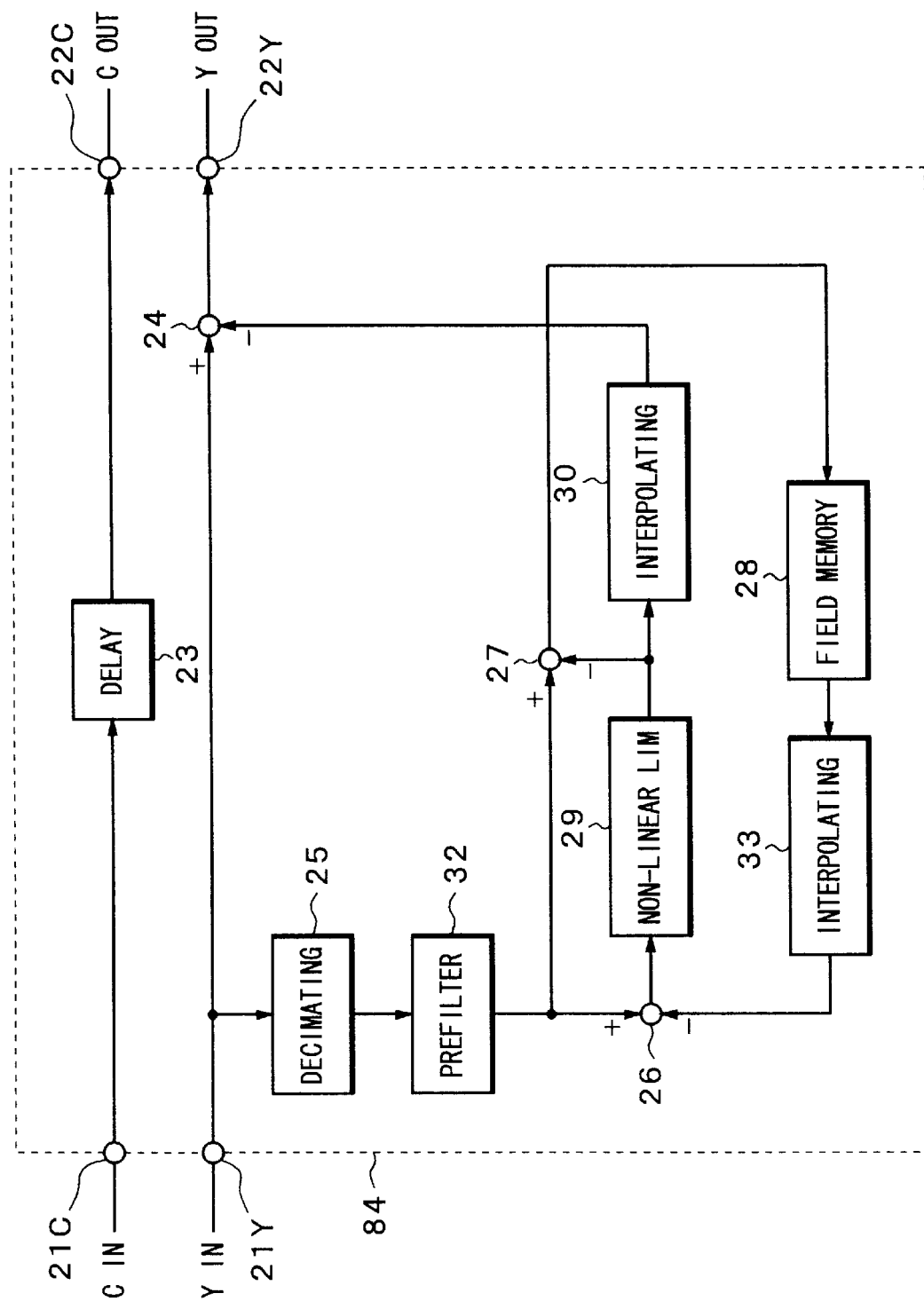
FIG. 20 is a block diagram showing the fifth embodiment of a noise reducer according to the invention.

In FIG. 20, reference numeral 84 denotes the fifth embodiment of a noise reducer. The fifth embodiment is common to the first embodiment shown in FIG. 2 with respect to a point that the noise reduction is performed to the luminance signal and the field memory 28 is used. The fifth embodiment is applied to a case of performing a decimation in the vertical direction in addition to the decimation in the horizontal direction as shown in FIG. 5C. The decimation in the vertical direction is executed by, for instance, writing every other line when an output signal of the subtracter 27 is written into the field memory 28. A band limitation is carried out by a prefilter 32 in the vertical direction in order to perform the vertical decimation.

Figure 21:
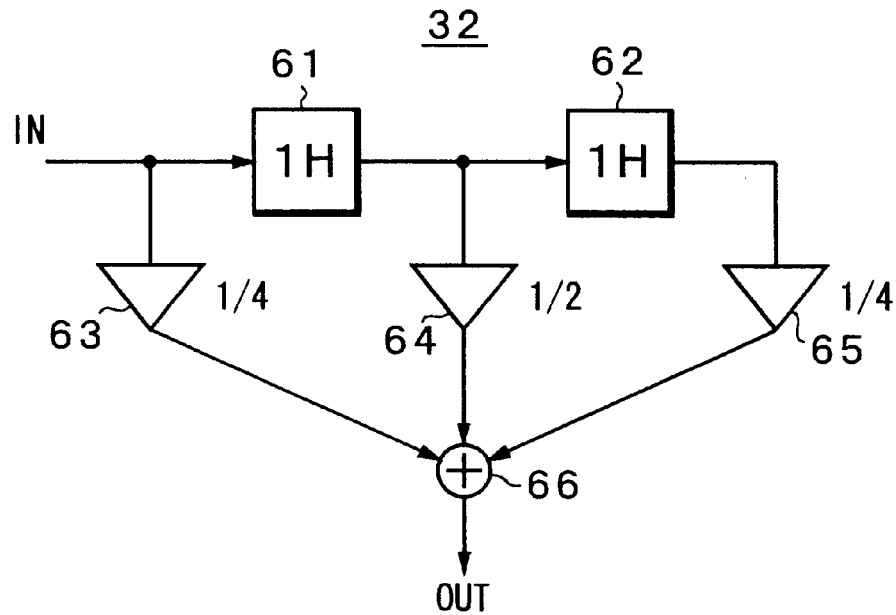
FIG. 21 is a block diagram of an example of a prefilter according to the fifth embodiment.

FIG. 21 shows a construction of an example of the prefilter 32 in the vertical direction. Reference numerals 61 and 62 denote 1-line delay elements, respectively. The delay elements 61 and 62 are serially connected. Multipliers 63, 64, and 65 to multiply filter coefficients are connected to three taps taken out from the serial connection of those delay elements and multiplication outputs are added by us an adder 66. The prefilter 32 shown in FIG. 21 is an FIR filter of three taps. A construction of a multiple connection is used in accordance with a decimation amount in a manner similar to the prefilter in the horizontal direction shown in FIG. 14.

Figure 22:
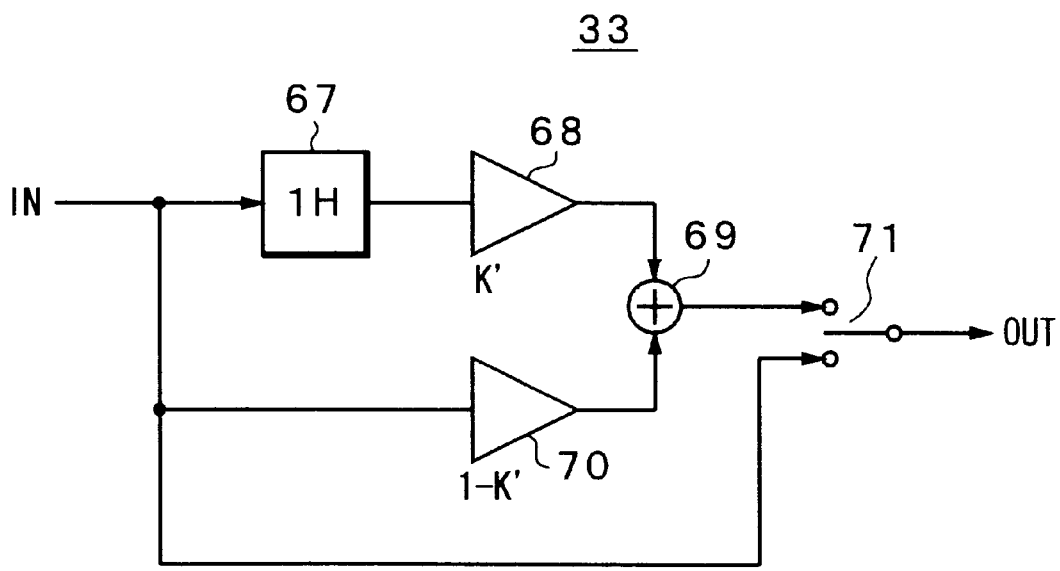
FIG. 22 is a block diagram of an example of an interpolating circuit in the fifth embodiment.

The data read out from the field memory 28 is supplied to the subtracter 26 through an interpolating circuit 33. The interpolating circuit 33 performs a linear interpolation in the vertical direction. FIG. 22 shows an example of the interpolating circuit 33. An input signal is supplied to an adder 69 through a 1-line delay element 67 and a coefficient (K') multiplier 68 and is also supplied to the adder 69 through a coefficient (1−K') multiplier 70. K' denotes an interpolation coefficient in the vertical direction and in case of the ½ decimation in the vertical direction, K'=½. The 1-line delay element 67 is constructed of a line memory or the like.

An output of the adder 69 is supplied as one input to a selector 71. The input data of the interpolating circuit 33 is supplied as another input of the selector 71. The selector 71 selects an output of the adder 69 in case of a line to be interpolated and selects the input data in case of a line using the data read out from the field memory 28. As mentioned above, the selector 71 performs the selecting operation on a line unit basis.

According to the invention, the noises of a low band which are most conspicuous and are generated upon decoding of block DCT can be removed. Moreover, even when the noise reduction is performed, a small amplitude of a high band can be preserved and a deterioration in fineness can be prevented. According to the invention, by performing the decimation, the memory amount which is used can be reduced and a field recursive noise reducer of low costs can be realized. Further, the invention has an advantage such that a system of a high end (decimation amounts of the luminance signal and chrominance signal are small) or a low end (decimation amount of only the luminance signal is large) can be constructed. The invention relates to a noise removing method which is effective for all of the systems using the DCT coding and has an advantage such that an application range is wide.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A noise reducer for reducing the amount of noise in image data which has been decoded from DCT coded data, comprising:
    decimating means for decimating said image data to generate decimated data;
    first noise canceling means for receiving said decimated data and removing decimated noise from said decimated data, thereby generating resultant decimated data;
    a memory for receiving said resultant decimated data and delaying said resultant decimated data by a predetermined amount to generate delayed data;
    noise extracting means for receiving said delayed data from said memory and said decimated data from said decimating means, and for generating said decimated noise from said delayed data and said decimated data;
    interpolating means for interpolating said decimated noise to generate an image data noise component; and
    second noise canceling means for removing said image data noise component from said image data.

2. The noise reducer according to claim 1, wherein said memory delays said resultant decimated data by one field period.

3. The noise reducer according to claim 2, wherein said noise extracting means generates said decimated noise by computing a difference between fields of said delayed data and said decimated data and extracting a low level component of said difference.

4. The noise reducer according to claim 1, wherein said memory delays said resultant decimated data by one frame.

5. The noise reducer according to claim 4, wherein said noise extracting means generates said decimated noise by computing a difference between frames of said delayed data and said decimated data and extracting a low level component of said difference.

6. The noise reducer according to claim 1, wherein said decimating means decimates said image data in the horizontal direction.

7. The noise reducer according to claim 1, wherein said decimating means decimates said image data in the vertical direction.

8. The noise reducer according to claim 1, wherein said decimating means decimates said image data in the horizontal and vertical directions.

9. The noise reducer according to claim 1, wherein said decimating means decimates said image data so that decimating positions are non-continuous in a vertical direction when said image data is decimated in a horizontal direction.

10. The noise reducer according to claim 1, wherein said decimating means includes a prefilter for performing a band limiting operation.

11. The noise reducer according to claim 10, wherein said prefilter includes a round processing circuit in a last stage.

12. The noise reducer according to claim 1, wherein said interpolating means performs a linear interpolation.

13. A noise reducer for reducing the amount of noise in image data which has been decoded from DCT coded luminance and chrominance data, comprising:
    decimating means for decimating said luminance data to generate decimated data;
    first noise canceling means for receiving said decimated data and removing decimated noise from said decimated data, thereby generating resultant decimated data;
    a memory for receiving said resultant decimated data and delaying said resultant decimated data by a predetermined amount to generate delayed data;
    noise extracting means for receiving said delayed data from said memory and said decimated data from said decimating means, and for generating said decimated noise from said delayed data and said decimated data;
    interpolating means for interpolating said decimated noise to generate a luminance data noise component; and
    second noise canceling means for removing said luminance data noise component from said luminance data.

14. The noise reducer according to claim 13, wherein said memory delays said resultant decimated data by one field period.

15. The noise reducer according to claim 13, wherein said memory delays said resultant decimated data by one frame.

16. A noise reducer for reducing the amount of noise in image data which has been decoded from DCT coded luminance and chrominance data, comprising:
    first decimating means for decimating said luminance data to generate decimated luminance data;
    first noise canceling means for receiving said decimated luminance data and removing decimated luminance noise from said decimated luminance data, thereby generating resultant decimated luminance data;
    a first memory for receiving said resultant decimated luminance data and delaying said resultant decimated luminance data by a predetermined amount to generate delayed luminance data;
    first noise extracting means for receiving said delayed luminance data from said first memory and said decimated luminance data from said first decimating means, and for generating said decimated luminance noise from said delayed luminance data and said decimated luminance data;
    first interpolating means for interpolating said decimated luminance noise to generate a luminance noise component;
    second noise canceling means for removing said luminance noise component from said luminance data;

second decimating means for decimating said chrominance data to generate decimated chrominance data;

third noise canceling means for receiving said decimated chrominance data and for removing decimated chrominance noise from said decimated chrominance data, thereby generating resultant decimated chrominance data;

a second memory for receiving said resultant decimated chrominance data and delaying said resultant decimated chrominance data by a predetermined amount to generate delayed chrominance data;

second noise extracting means for receiving said delayed chrominance data from said second memory and said decimated chrorkinance data from said second decimating means, and for generating said decimated chrominance noise from said delayed chrominance data and said decimated chrominance data;

second interpolating means for interpolating said decimated chrominance noise to generate a chrominance noise component; and fourth noise canceling means for removing said chrominance noise component from said chrominance data.

17. The noise reducer according to claim 16, wherein said first memory delays said resultant decimated luminance data by one field period and said second memory delays said resultant decimated chrominance data by one field period.

18. The noise reducer according to claim 16, wherein said first memory delays said resultant decimated luminance data by one frame period and said second memory delays said resultant decimated chrominance data by one frame period.

* * * * *